US008049890B2

(12) United States Patent
Neus

(10) Patent No.: US 8,049,890 B2
(45) Date of Patent: Nov. 1, 2011

(54) SYSTEM AND METHOD FOR PASSIVE ALIGNMENT OF COMPONENTS IN AN OPTICAL BENCH

(76) Inventor: James Neus, Plymouth, MN (US)

( * ) Notice: Subject to any disclaimer, the term of this patent is extended or adjusted under 35 U.S.C. 154(b) by 181 days.

(21) Appl. No.: 12/371,384

(22) Filed: Feb. 13, 2009

(65) Prior Publication Data

US 2010/0208265 A1     Aug. 19, 2010

(51) Int. Cl.
*G01B 11/00* (2006.01)
(52) U.S. Cl. ........ 356/399; 356/401; 385/137; 385/134; 385/47
(58) Field of Classification Search .......... 356/399–401; 385/137, 134, 47
See application file for complete search history.

(56) References Cited

U.S. PATENT DOCUMENTS

| | | | |
|---|---|---|---|
| 5,179,609 A | | 1/1993 | Blonder et al. |
| 5,243,673 A | | 9/1993 | Johnson et al. |
| 5,257,332 A | * | 10/1993 | Pimpinella ............ 385/59 |
| 5,259,054 A | | 11/1993 | Benzoni et al. |
| 5,440,655 A | * | 8/1995 | Kaplow et al. ............ 385/25 |
| 5,611,006 A | * | 3/1997 | Tabuchi ............ 385/14 |
| 5,841,917 A | * | 11/1998 | Jungerman et al. ............ 385/17 |
| 5,862,283 A | * | 1/1999 | Trott et al. ............ 385/88 |
| 6,389,189 B1 | * | 5/2002 | Edwards et al. ............ 385/18 |
| 6,404,942 B1 | * | 6/2002 | Edwards et al. ............ 385/18 |
| 6,456,766 B1 | | 9/2002 | Shaw et al. |
| 6,477,303 B1 | | 11/2002 | Witherspoon |
| 6,625,372 B1 | | 9/2003 | Flanders et al. |
| 2003/0161603 A1 | * | 8/2003 | Nadeau et al. ............ 385/137 |

FOREIGN PATENT DOCUMENTS

| | | |
|---|---|---|
| EP | 0826992 | 3/1998 |
| WO | 9944088 | 9/1999 |
| WO | 0141539 A2 | 6/2001 |
| WO | 0165292 | 9/2001 |

OTHER PUBLICATIONS

European Patent Office, "European Search Report", Mar. 30, 2010, Published in: EP.
Marxer et al., "Micro-Opto-Mechanical 2×2 Switch for Single-Mode Fibers Based on Plasma-Etched Silicon Mirror and Electrostatic Actuation", "Journal of Lightwave Technology", Jan. 1999, pp. 2-6, vol. 17, No. 1, Publisher: IEEE.

* cited by examiner

*Primary Examiner* — Tarifur Chowdhury
*Assistant Examiner* — Isiaka Akanbi
(74) *Attorney, Agent, or Firm* — Fogg & Powers LLC

(57) ABSTRACT

A system and method for facilitating passive alignment of an optical component in an optical bench. A groove is etched into the optical bench. The groove has two sections. The first section is configured to act as an optical guide. The second section is configured to receive the optical component. An optical component is inserted into the first section and moved into the second section. The optical component may be bonded to the optical bench.

19 Claims, 3 Drawing Sheets

SYSTEM AND METHOD FOR PASSIVE ALIGNMENT OF COMPONENTS IN AN OPTICAL BENCH

BACKGROUND OF THE INVENTION

One of the primary technical challenges associated with the manufacture of optical systems is component alignment of optical devices. In the manufacturing Micro Electro-Mechanical Systems (MEMS) devices, sub-micrometer alignment tolerances are often required.

There are two general classes of alignment strategies for optical components: active and passive. In passive alignment, alignment features are fabricated directly on the components as well as on the substrate to which the components are to be mounted. The components are then mounted and bonded directly to the substrate using the alignment features.

In active alignment, an optical signal is transmitted through the components and detected, sometimes after an initial passive alignment of the components. The alignment is performed manually, based on checking and adjusting the optical components to achieve the desired performance of the system. Accordingly, the process of checking and adjusting optical components requires substantially higher labor costs than passive alignment. The difference in labor costs is further compounded in fabricating MEMS devices because MEMS devices can have hundreds of components that need to be aligned in order for the system to function properly. In such a system, the cost of active alignment could total thousands of times the cost of passive alignment.

Generally, optical system manufacturing seeks to improve the efficiency of which the optical systems can be configured. Passive alignment is essential to any large scale manufacturing of MEMS optical systems because it drastically reduces the necessary labor costs. The availability of passive aligning optical components greatly influences whether it is economically feasible to produce a particular MEMS optical device.

SUMMARY OF THE INVENTION

Using grooves to facilitate passive alignment of optical components in an optical bench. One or more grooves are etched into the optical bench. The grooves are configured to act as optical guides. An optical component is inserted into a first section of the groove and moved into the second section of the groove. The first section of the groove is tapered and is configured to guide the optical components into the second section. The second section is configured to receive the optical component.

In accordance with yet other aspects of the invention, the optical component is then bonded to the optical bench.

In accordance with still another aspect of the invention, a lid is attached to the optical bench to cover the etched grooves and optical components.

In accordance with still further aspects of the invention, the slot section of the etched groove intersects with a second etched groove.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
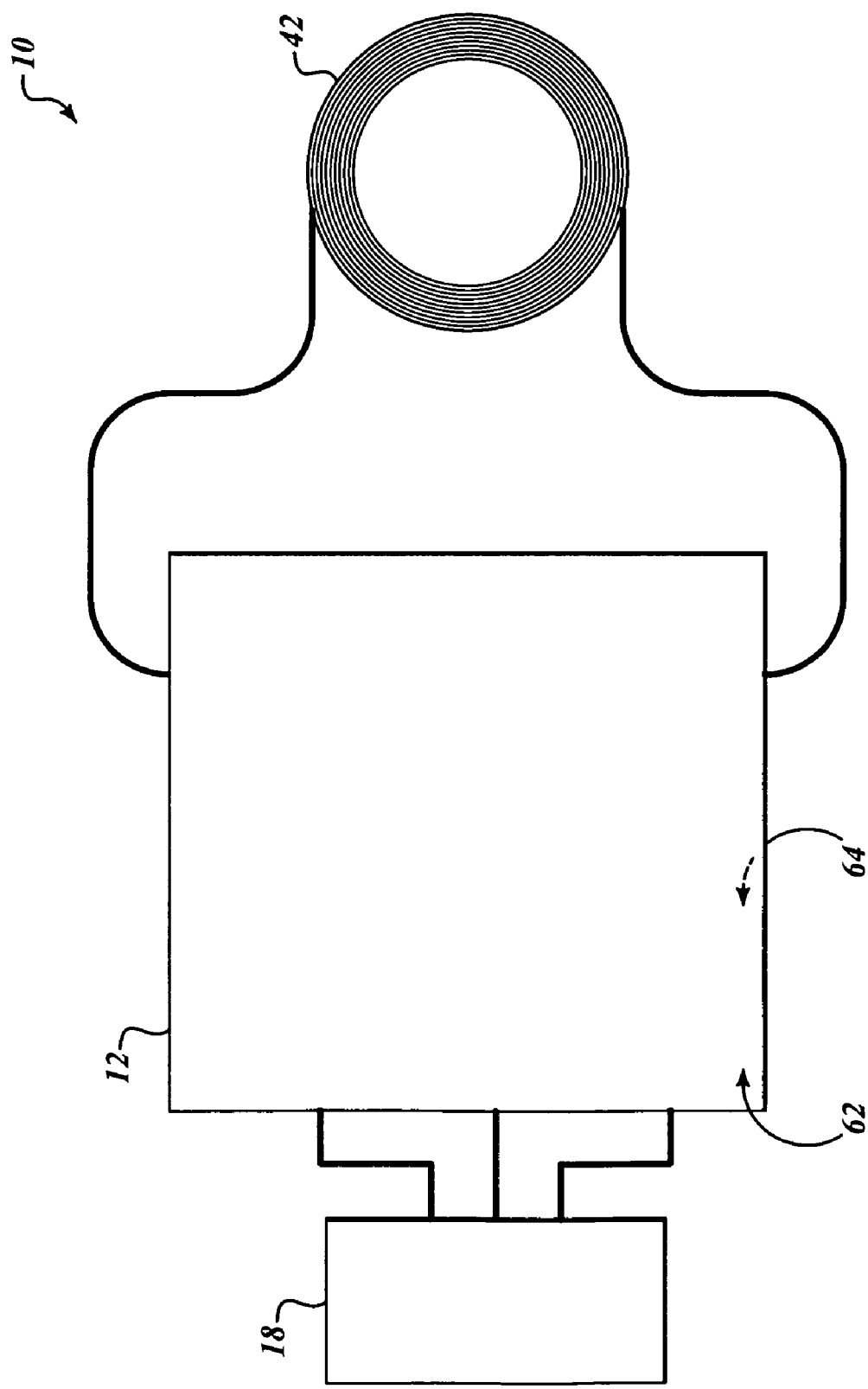
FIG. 1 is a top view of the optical bench system formed in accordance with an embodiment of the present invention.

FIG. 1 shows an optical bench system 10 utilizing MEMS processes and materials. The optical bench system 10 includes an optical bench 12, a laser light source 18, and a coil 42. The optical bench 12 includes a substrate, preferably made out of silicon. The optical bench 12 has a first surface 62 and a second surface 64. In some embodiments, the first surface 62 and/or second surface 64 of the optical bench 12 could be closed with one or more lids to protect and/or attach optical components (not shown) to the optical bench 12.

Figure 2:
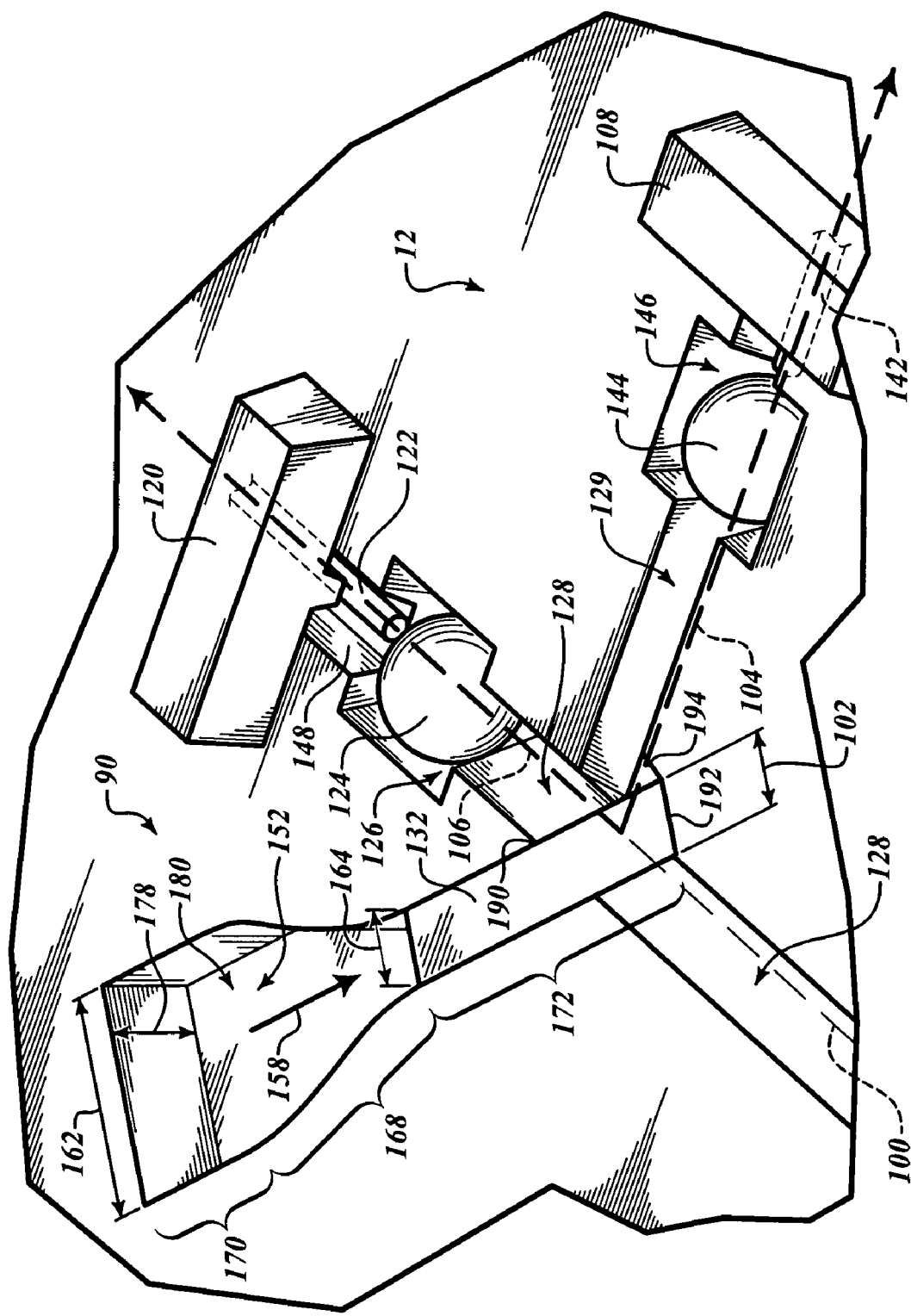
FIG. 2 is a perspective view of a portion of an optical bench system formed in accordance with an embodiment of the present invention.

FIG. 2 shows a detailed view of the integration of an optical alignment system 90 into the optical bench 12. A tapered recess 152 is etched into the first surface 62 the optical bench 12 to facilitate passive alignment of a mirror 132 while maintaining the desired tolerances. The etching is accomplished utilizing Deep Reactive Ion Etching (DRIE) techniques. The tapered recess 152 has three sections: a rear section 170, a tapered section 168 and a slot section 172. The rear section 170 has a width 162, which is constant. The slot section 172 has a width 164, which is constant. The tapered section 168 has a width that tapers, starts at equal to the width of the rear section 162 and ends with the width 164 of the slot section 172. The tapered recess 152 has a floor 180 having a depth 178. Throughout the tapered recess 152, the depth 178 is constant.

The tapered recess 152 has a first slot end point 190 and a second slot end point 192. The mirror 132 has to where most of the mirror 132 is located in the slot section 172, with one end of the mirror 132 in contact with the second slot endpoint 192. After the mirror 132 is received within the slot section 182, the mirror 132 is exposed to a first etched groove 128 and a second etched groove 129 between the first slot end point 190 and the second slot end point 192. An arrow 158 indicates the direction that the mirror 132 has been moved to effectuate passive alignment of the mirror 132 in the optical bench 12. The mirror 132 has a width 102 that is smaller than the width 164 of the slot section 172. The difference between the width 164 of the slot section 172 and the width 102 of the mirror 132 should be configured so that the mirror 132 may be passively aligned into its desired position. Proper insertion of the mirror 132 is crucial because it ensures the laser light will be split and steered to other optical components the optic circuit. Misplacement of the mirror 132 can cause gross misalignments.

Laser light enters this view of the system via a first optical fiber 122, which is in a first etched groove 148. Laser light travels below the surface of the optical bench 12 in a series of etched grooves. The first optical fiber 122 is located below the surface of the optical bench 12. A first resilient clamp 120 holds the first optical fiber 122 in place in the first etched groove 148. Laser light leaves the first optical fiber 122 and enters a second etched groove 126. The second etched groove contains a first ball lens 124. The first ball lens 124 columnates the laser light. The laser light leaves the first ball lens 124 and enters a third etched groove 128. A mirror 132 is exposed to the laser light traveling along a first path 106 in the third etched groove 128 between the first slot end point 190 and the second slot end point 192. The mirror 132 is configured to function as a beam splitter. The ratio of reflection versus transmission of laser light at the mirror 132 depends on the composition of the mirror 132 and the composition and thickness of material used to coat the mirror 132. The mirror 132 is made of silicon and is coated with a dielectric. In other embodiments, the mirror 132 could reflect all light. Complete reflection is accomplished by coating the mirror 132 with a metal.

Some laser light is transmitted through the mirror 132 in the direction of a third path 100, while some laser light is reflected off the mirror 132 along the direction of a second path 104 in a fourth etched groove 129. The third etched groove 128 is oriented perpendicular to the fourth etched groove 129. An angle 194 is formed between the mirror 132 and the fourth etched groove 129. The angle between the mirror 132 resting within the slot section 172 and the fourth etched groove 129 is approximately 45 degrees.

After reflecting off the mirror 132 and entering the fourth etched groove 129, the laser light enters a fifth etched groove 146. The fifth etched groove 146 contains a second ball lens 146. Laser light enters the second ball lens 144. The second ball lens 144 columnates the laser light and directs it towards a second optical fiber 142 that is held in place by a second resilient clamp 108.

Figure 3:
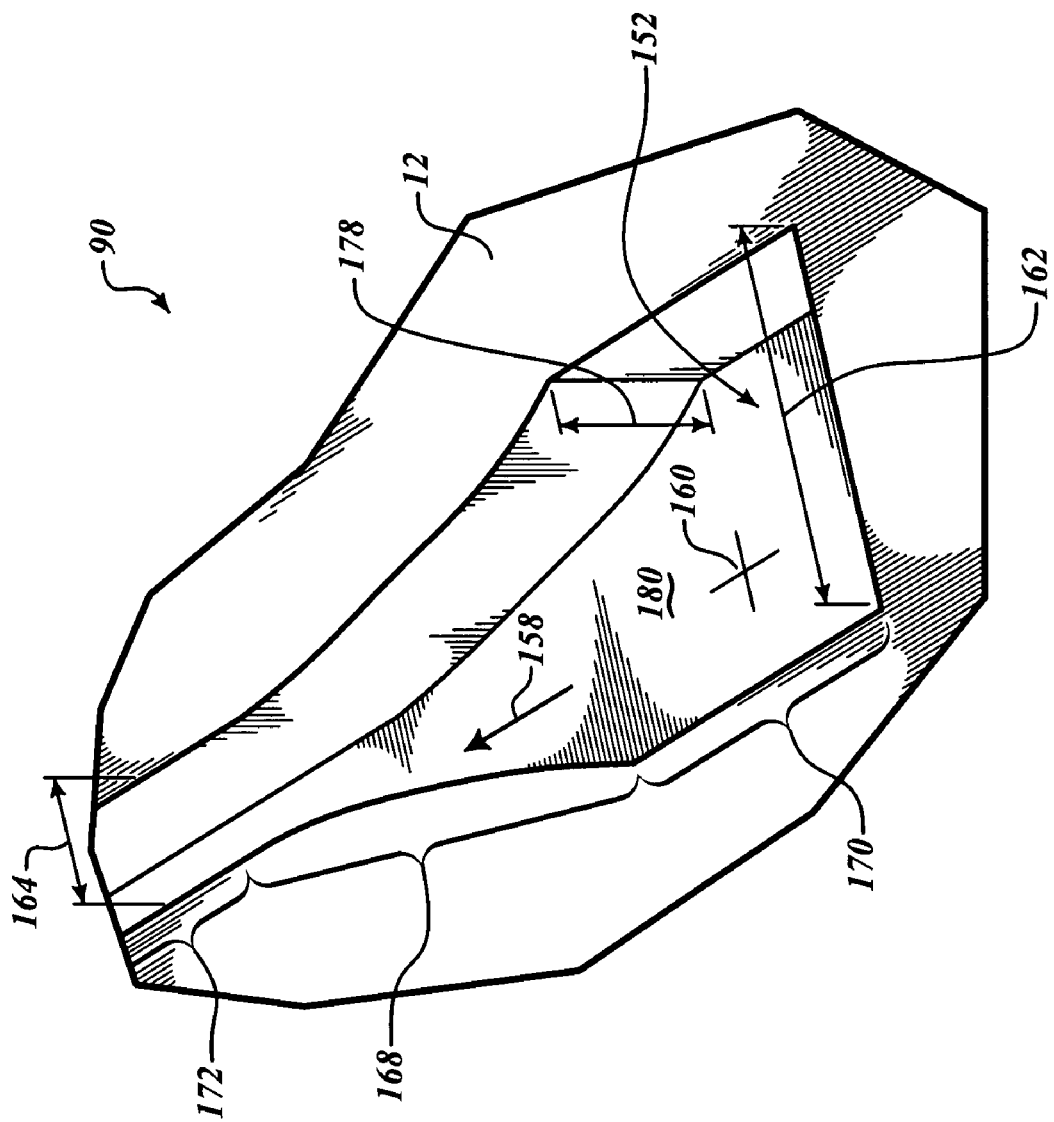
FIG. 3 is a perspective view of an inventive tapered recess etched into an optical bench.

FIG. 3 is a perspective view of the mirror insertion system 90. In one embodiment, the tapered recess 152 is etched directly into the optical bench 12 so that the mirror 132 is located below the surface of the optical bench 12. The tapered recess 152 has a depth 178 that is greater than the height of any optical component in the mirror insertion system 90. In alternative embodiments, an optical component may have a height that is greater than the depth 178 of the tapered recess 152.

The width of the rear section 162 is approximately three times larger than the width 102 of the mirror 132. The tapered recess 152 has a floor 180 that is flat. The walls of the tapered recess 152 are oriented perpendicular to the floor 180. The tapered recess 152 has a drop target 160. The drop target 160 is where the mirror is placed when it initially enters the mirror insertion system 90. In this embodiment, the tapered section 168 is convex with respect to substrate of the optical bench 12. However, concave or straight transitions from the rear section 172 to slot section 168 could be utilized.

A method for inserting a mirror into the optical bench system 10 ensures that the mirror 132 is passively aligned into the slot section 170 while keeping within a very small tolerance with respect to the optical bench 12. A first step of the method involves etching a tapered recess 152 into the optical bench 12. Referring to FIG. 3, the tapered recess 152 is etched into the base using DRIE techniques. A second step is to manually or robotically drop the mirror 132 into the tapered recess 152 so that the mirror 132 rests initially on the drop target 160. A third step is to move the mirror 132 in the direction of the arrow 158 into the slot section 172 until the end of the mirror 132 contacts the slot end point 138. In the third step, the decreasing width of the tapered section 168 guides the optical component smoothly into the slot section 170. The movement of the mirror 132 into the slot section 172 is done by hand with a vacuum pencil. Alternatively, robotic means or three-axis controller could be used to move the mirror 132 into the slot section 172. Movement of the mirror 132 in the direction of the arrow 158 ceases when the mirror reaches the second slot endpoint 192 of the tapered recess 152. The mirror 132 is then secured to the optical bench 12. The mirror 132 could be secured to the optical bench 12 by bonding using a UV cured epoxy. Preferably, the epoxy is applied to both the mirror 132 and the optical bench 12 at the second slot endpoint 192. Other types of glues or epoxies could be utilized. Alternatively, the mirror 132 could be secured to the optical bench 12 by wedging the mirror 132 into the slot section 172. Also, the mirror 132 could be held in place by wedging silicon or some other material into the tapered recess 152 behind the inserted mirror 132. Once the end of the mirror 132 is secured to the second slot endpoint 192, no further alignment is necessary. An optional step is to attach a lid to the first surface 62 and/or second surface 64. The lid may be attached to the optical bench 12 by fusing, soldering or forming eutectic bonds. The method saves time and money by passively aligning the mirrors in the optical bench 12.

In alternative embodiments various optical components can be added or rearranged to split, merge, and/or measure laser light in order to build different optical systems known to those of ordinary skill in the art. Other etching techniques may be used that are capable of producing straight vertical or negatively sloped side walls. Also, light sources may be used that produce light other than laser light. Additionally, it is understood that more than one mirror could be aligned in the optical bench 12. Moreover, optical components other than mirrors may be aligned using the principles of this invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
   an optical bench, the optical bench having a first surface and a second surface;
   an optical having a height and a width; and
   an etched groove,
   wherein the etched groove is an optical component alignment device comprising a first etched section and a second etched section, the first etched section having a first depth and a first width that tapers, the second etched section having a second depth and a second width a second width, a first end, and a second end,
   wherein the second etched section is configured to receive the optical component, and
   wherein the width of the optical component and the second width of the second etched section are configured to passively align the optical component within the second etched section.

2. The system of claim 1, further comprising a second etched groove, wherein the first end is open to the second etched groove.

3. The system of claim 2, wherein the second end is open to the second etched groove.

4. The system of claim 1, wherein the second etched section has a constant width.

5. The system of claim 1, wherein the height of the optical component is greater than the second depth of the second etched section.

6. The system of claim 1, wherein the optical component includes a mirror.

7. The system of claim 6, wherein the mirror is configured for splitting light.

8. The system of claim 7, wherein a lid is attached to the first surface, wherein the lid covers the etched groove.

9. The system of claim 1, wherein the optical component is located between the first surface and the second surface of the optical bench.

10. The system of claim 1, wherein the etched groove is located on the first surface.

11. The system of claim 1, wherein:
the width of the optical component and the second width of the second etched section are configured to secure the optical component within the second etched section.

12. A method of passively aligning an optical component having a width in an optical bench, the method comprising:
etching the optical component guide in the optical bench, the guide having a first section and a second section, the first section having a tapered first width, the second section having a second width, a first end, and a second end, the second section configured to receive the optical component;
inserting the optical component in the first section; and
moving the optical component into the second section until the optical component contacts the second end,
wherein the width of the optical component and the second width of the second section are configured to passively align the optical component within the second section.

13. The method of claim 12, further comprising bonding the optical component to the optical bench.

14. The method of claim 12, further comprising attaching a lid to the optical bench.

15. The method of claim 12, further comprising:
securing the optical component within the second section.

16. A mirror alignment system comprising:
one or more mirrors; and
one or more etched grooves,
wherein the one or more etched grooves is an alignment device comprising a first etched section and a second etched section, the first etched section having a first depth and a first width and the second etched section having a second depth and a second width,
wherein the first width of the first etched section is tapered,
wherein the second etched section has a first end and a second end,
wherein the second etched section is configured to receive the one or more mirrors, and
wherein the tapered first width of the first etched section is configured to guide the one or more mirrors into the second etched section.

17. The system of claim 16, wherein the first end and the second end are open to at least one other etched groove.

18. The system of claim 16, wherein the width of the second etched section is constant.

19. The system of claim 16, wherein the width of the one or more mirrors and the second width of the second etched section are configured to secure the optical component within the second etched section.

* * * * *